(12) United States Patent
Hutzler et al.

(10) Patent No.: US 8,617,732 B2
(45) Date of Patent: Dec. 31, 2013

(54) BATTERY END CAP

(75) Inventors: Richard Hutzler, Ocean Shores, WA (US); Keith B. Maddern, Tucson, AZ (US); William M. Smith, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/164,649

(22) Filed: Jun. 20, 2011

(65) Prior Publication Data

US 2012/0321937 A1    Dec. 20, 2012

(51) Int. Cl.
*H01M 2/02*    (2006.01)

(52) U.S. Cl.
USPC ............................................. 429/61; 429/175

(58) Field of Classification Search
USPC .......................................... 429/61, 122, 175
See application file for complete search history.

(56) References Cited

U.S. PATENT DOCUMENTS

| | | | |
|---|---|---|---|
| 5,766,790 A * | 6/1998 | Kameishi et al. | 429/61 X |
| 5,879,832 A | 3/1999 | Vu et al. | |
| 6,210,824 B1 * | 4/2001 | Sullivan et al. | 429/61 X |
| 6,570,749 B1 | 5/2003 | Ling et al. | |
| 6,576,364 B1 | 6/2003 | Mitchell, Jr. et al. | |
| 6,828,060 B2 | 12/2004 | Zavilenski | |
| 2002/0041159 A1 | 4/2002 | Kaping, Jr. | |
| 2005/0255376 A1 * | 11/2005 | Cho et al. | 429/61 |
| 2006/0115713 A1 * | 6/2006 | Kim et al. | 429/61 |
| 2009/0162743 A1 | 6/2009 | Nam et al. | |
| 2010/0021806 A1 | 1/2010 | Simon et al. | |

FOREIGN PATENT DOCUMENTS

| | | |
|---|---|---|
| JP | 59-029353 | 2/1984 |
| JP | 59-042765 | 3/1984 |
| JP | 59-044762 | 3/1984 |
| JP | 59-044764 | 3/1984 |

* cited by examiner

*Primary Examiner* — Stephen J. Kalafut
(74) *Attorney, Agent, or Firm* — Kunzler Law Group

(57) ABSTRACT

An battery end cap is disclosed for limiting current flow of a battery. The battery end cap includes a cap terminal, the cap terminal comprising an external conductive surface and an internal conductive surface. The battery end cap further includes a pressure sensitive switch, wherein when the battery end cap is installed on a battery, the pressure sensitive switch is configured to bias the internal conductive surface of the cap terminal from being in electrical communication with an electrical source of the battery. Electrical communication between the cap terminal and the electrical source is created or maintained when a sufficient external pressure is applied to the battery end cap and electrical contact between the cap terminal and the internal electrical source is broken without the sufficient external pressure.

17 Claims, 9 Drawing Sheets

BATTERY END CAP

BACKGROUND

1. Field

The subject matter disclosed herein relates to batteries and more particularly relates to battery end caps.

2. Description of the Related Art

Batteries are commonly used as electrical sources for use in portable devices that utilize electricity to function. Because batteries are used in portable devices, there is often strong motivation to make batteries as small as possible while still providing the needed amount of electrical energy. Exemplary small form factors include button style, coin style, or disk style batteries. These batteries can be extremely useful because of their ability to provide a current source without taking up much space and being quite light. These batteries allow for smaller and lighter devices to be created which can provide considerable utility to a user.

As such, such batteries are often used in devices where size and weight is important. For example, batteries having one of these small form factors are often used in such devices as watches, calculators, or even musical gift cards where a larger battery may defeat the purpose or utility of such a device. In addition, these batteries are often used as reserve power for numerous larger devices. For example, button, coin, or disk style batteries are often used in computers to maintain an internal clock or BIOS memory in the case of loss of power or unplugging of the computer from an outside power source. Because of their utility, these small form factor batteries are extremely common.

However, the utility of these small form factor batteries is somewhat over-shadowed by their danger to children. Because of their small form factor, these batteries are often swallowed by children. At times, the batteries can be lodged in a child's throat, which may result in severe danger or death to the child. For example, when lodged in a child's throat, the batteries may induce a current through a portion of the child's esophagus which may damage the tissue. In fact, death can result in as little as two hours.

BRIEF SUMMARY

From the foregoing discussion, it should be apparent that a need exists for an apparatus, system, and method that provide the utility of small form factor batteries without the risks of harm in case of swallowing by an adult or child. Beneficially, such an apparatus, system, and method would only slightly increase the size of small form factor batteries while providing features that protect children from current flow that may be induced if ingested.

The present invention has been developed in response to the present state of the art, and in particular, in response to the problems and needs in the art that have not yet been fully solved by currently available small form factor batteries. Accordingly, the present invention has been developed to provide an apparatus, system, and method for a battery end cap that overcomes many or all of the above-discussed shortcomings in the art.

A battery end cap includes a cap terminal and a pressure sensitive switch. The cap terminal includes an external conductive surface and an internal conductive surface. When the battery end cap is installed on a battery, the pressure sensitive switch is configured to bias the internal conductive surface of the cap terminal from being in electrical communication with an electrical source of the battery. The pressure sensitive switch is in a closed position when a sufficient external pressure is applied to the battery end cap and the pressure sensitive switch is in an open position without the sufficient external pressure.

A battery includes an electrical source and a casing. The battery also includes a cap terminal and a pressure sensitive switch. The cap terminal includes an external conductive surface and an internal conductive surface. When the battery end cap is installed on a battery, the pressure sensitive switch is configured to bias the internal conductive surface of the cap terminal from being in electrical communication with an electrical source of the battery. The pressure sensitive switch is in a closed position when a sufficient external pressure is applied to the battery end cap and the pressure sensitive switch is in an open position without the sufficient external pressure.

A method of the present invention is also presented for creating a battery having an end cap. In one embodiment, the method includes providing a battery and a battery end cap, and installing the battery end cap on the battery. The battery end cap includes a first end and a second end as well as a cap terminal and a pressure sensitive switch.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

The present disclosure discusses battery end caps that include a pressure sensitive switch. In various embodiments, the pressure sensitive switch stops current flow when a battery is removed from a battery compartment of a device. Embodiments where the end caps are built-into a battery or are mountable on a battery after manufacture are provided.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of batteries, battery form factors and materials, pressure sensitive switches, battery end caps, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to perspective views schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented in a variety of manners without departing from the scope of the present disclosure.

Figure 1A:
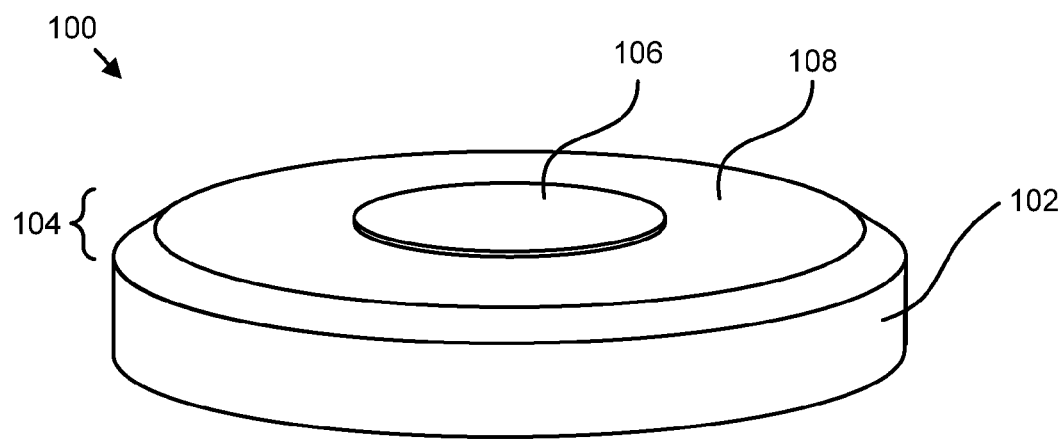
FIGS. 1A-1C illustrate one embodiment of a battery and end cap in accordance with the present invention.
Figure 1B:
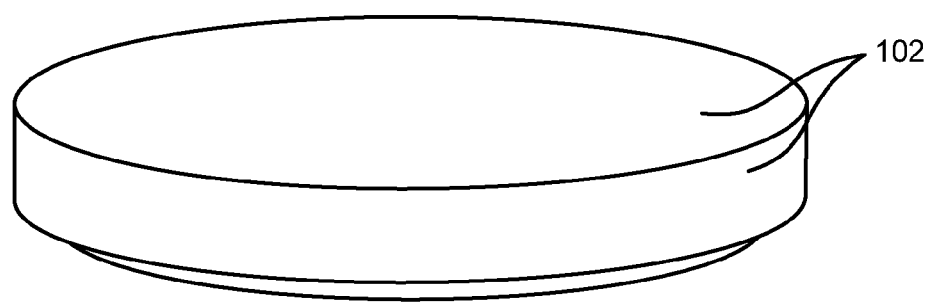
Figure 1C:
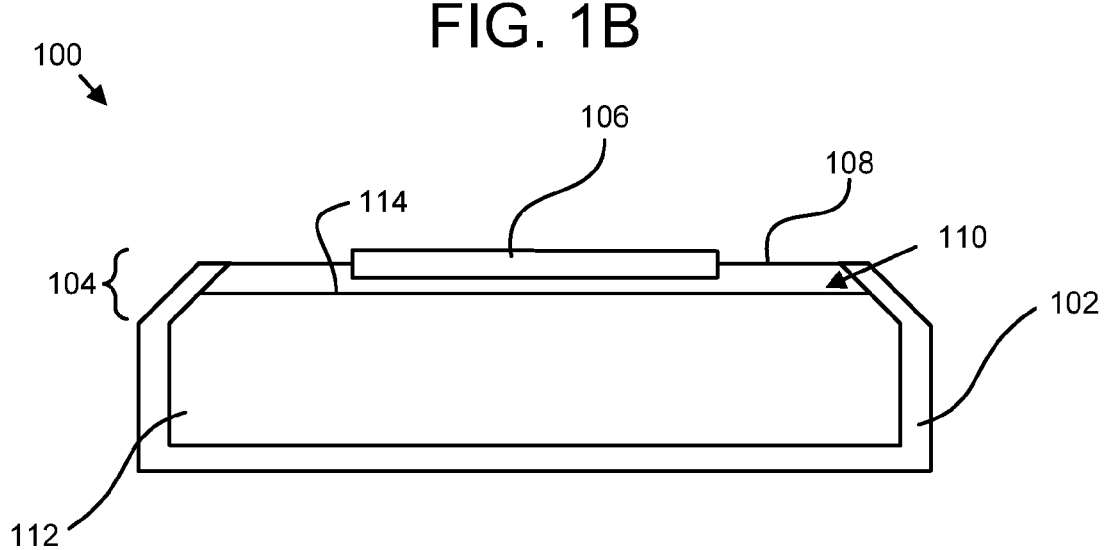

FIGS. 1A-1C depict an exemplary embodiment of a battery 100 having a button style form factor and a battery end cap 104. In FIG. 1A the battery 100 is illustrated from a perspective view showing its external shape. The battery 100 is depicted as if it were resting on its lower end (not visible) with the upper end and side of the battery visible. The battery 100 is depicted as having a substantially cylindrical shape with a height shorter than its diameter, similar to a button, disk or coin. As used herein, the terms "button battery", "button form factor", and "button style battery" will be used to describe batteries having any of the button, disk, or coin style form factors. It will be understood by one skilled in the art in light of the present disclosure that the form factors depicted herein are exemplary only and can vary considerably without departing from the scope of the present invention.

According to one embodiment, the battery 100 includes dimensions that meet one or more battery dimension standards. For example, standard setting organizations create dimension standards for batteries such that batteries made by different manufactures can be made to conform to the dimension standards. Consumers may then be able to interchange batteries from different manufacturers in devices.

According to the depicted embodiment, the battery 100 includes a casing 102 and an end cap 104. The end cap 104 includes a pressure sensitive switch that includes a cap terminal 106 and a flexible wall 108. The flexible wall 108 allows for movement of the cap terminal 106 in a vertical direction to selectively engage the pressure sensitive switch and allow the battery 100 to provide a voltage and/or a current to a circuit.

FIG. 1B illustrates the battery 100 of FIG. 1A from a perspective view as if the battery 100 is resting on its upper end. Thus, the cap terminal 106 and flexible wall 108 of the end cap 104 are not visible in this view. The battery 100 is depicted with a substantially circular and flat lower end as defined by the casing 102. The casing 102 is depicted as enclosing the side and lower end of the button style battery 100. According to one embodiment, the casing 102 provides a structural support for other components of the battery 100.

The casing 102 may be formed of a wide variety of materials. In one embodiment, the casing 102 is formed of a single material, such as an electrical conductor or an electrical insulator. According to another embodiment, the casing 102 includes one or more materials such as an electrical conductor and an electrical insulator. According to one embodiment, at least a portion of the casing 102 includes a conductor which acts as a terminal of the battery 100.

According to one embodiment both the cap terminal 106 and the casing 102 each act as terminals on the battery 100. According to one embodiment, the cap terminal 106 acts as a positive terminal while the casing 102 acts as negative terminal of the battery 100. According to one embodiment, the cap terminal 106 acts as a negative terminal while the casing 102 acts as positive terminal. In one embodiment, the casing 102 may act as an end terminal in that electrical connection with the battery 100 may be created with the end of the battery, for example the lower end of the battery 100 that is visible in FIG. 1B. In one embodiment, the casing 102 may act as a side terminal in that electrical connection with the battery 100 may be created on the side of the battery.

FIG. 1C is a cross-sectional side view of the battery 100 of FIGS. 1A and 1B illustrating exemplary cross-sectional structure and internal configuration of the battery 100. The cross-sectional side view reveals a gap 110 and an electrical source 112 within the battery 100. The electrical source 112 includes a conductive surface 114 facing the gap 110 and cap terminal 106. According to one embodiment, the separation of the cap terminal 106 from the conductive surface 114 of the electrical source 112 by the gap 110 may restrict current flow through the battery 100. In other words, the gap 110 may have an impedance such that little or no current can flow between the electrical source 112 and the cap terminal 106.

According to one embodiment, the impedance of the gap 110 may vary as it compressed or expanded. For example, the impedance of the gap 110 may be at 100% (a maximum value) when it is not compressed and at 0% (minimum value) when the gap 110 is compressed such that the cap terminal 106 and the conductive surface 114 are in contact. According to one embodiment, the impedance of the gap 110 may vary linearly as the gap is compressed. According to another embodiment, the impedance of the gap 110 may vary in a step-wise manner. For example, the impedance of the gap may be close to 100% until the gap 110 is completely closed.

According to one embodiment, the flexible wall 108 provides tension to bias the cap terminal 106 from contacting the electrical source 112. For example, a rigid battery casing 102 may provide a rigid anchor for providing sufficient tension to the flexible wall 108 to bias the cap terminal 106 away from the conductive surface 114. According to one embodiment, a material in the gap 110 may provide an internal pressure to bias the cap terminal 106 from contacting a conductive surface 114 of the electrical source 112. For example, the gap 110 may be filled with a gas, liquid, gel, or other material that provides an internal pressure to bias the cap terminal 106 from contacting the conductive surface 114. In one embodiment, a bias of the cap terminal 106 away from the conductive surface 114 is provided by both tension of the flexible wall 108 and an internal pressure provided by a material in the gap 110. In one embodiment, the bias is provided by a spring within the gap 110

According to one embodiment, a pressure or force (such as a downward pressure in the orientation depicted in FIGS. 1A and 1C) to the cap terminal 106 may cause the gap 110 between the cap terminal 106 and the conductive surface 114 to be closed, thereby overcoming the tension or bias provided by the flexible wall 108 to allow current to flow between the cap terminal 106 and the electrical source 112. According to one embodiment, a pressure on the cap terminal 106 may be provided by an electrical contact in a battery compartment of a device.

According to one embodiment, pressure on the cap terminal 106 must be maintained in order to maintain electrical communication with the electrical source 112. For example, the flexible wall 108, cap terminal 106, and gap 110 may operate as a momentary on switch in that current is only allowed to flow so long as sufficient pressure is applied to the cap terminal 106. When a sufficient pressure is removed, the gap 110 may be widened, for example due to a bias of the cap terminal 106 away from the conductive surface 114, and electrical communication with the electrical source 112 may be broken. For purposes of the present disclosure the term "momentary on switch" is given to mean a switch that defaults to an open (high impedance) position and is only closed (low impedance) when input, such as pressure, is applied and maintained. If input, such as pressure, is removed, the momentary on switch will then return to an open (high impedance) position.

The amount of pressure needed to close the gap 110, or maintain the gap in a closed position, and allow current to flow may vary considerably, in various embodiments. According to one embodiment, aspects of the flexible wall 108 may be varied to vary the amount of pressure needed. For example, materials that are more flexible may reduce the amount of pressure needed. Furthermore, materials that are more easily stretched may reduce the amount of pressure needed. With the material held constant, the thickness of the flexible wall and the distance between the cap terminal 106 and casing 102 may also affect the amount of pressure needed. For example, a thicker wall and/or a shorter distance may require greater force or pressure. Exemplary materials of which the flexible wall 108 may be formed include coated mylar, rubber, neoprene, plastic, or other material.

According to one embodiment, the flexible wall 108 is anchored to the casing 102 and the cap terminal 106. In one embodiment, the material from which the flexible wall 108 is formed may comprise an electrical insulator to restrict current flow between the two. For example, if the casing 102 is formed of a conductor and the cap terminal 106 formed of a conductor the flexible wall 108 may be formed of an electrically insulating material to limit current flow between the two.

The gap 110 may be filled with a variety of materials. According to one embodiment, the gap 110 may be substantially void of material, such as a vacuum. In one embodiment, the gap 110 may be filled with a gas. For example, the gap 110 may be filled with air, an inert gas, or any other gas. In one embodiment, the gap 110 may be filled with a liquid. For example, the gap 110 may be filled with a non-conductive liquid such as a non-conductive oil. In one embodiment, the gap 110 may include both a liquid and a gas.

In one embodiment, the gap 110 is enclosed by the casing 102, cap terminal 106 and flexible wall 108 in an airtight or liquid tight manner. This may be desirable to maintain material in the gap 110 within the gap 110. For example, if the gap 110 is filled with a liquid, the gap 110 may be enclosed in a liquid tight fashion such that the liquid cannot escape or other liquid or air cannot seep into the gap 110. It may also be desirable to maintain an airtight or liquid tight gap 110 to restrict the possibility of bodily fluids within a child to enter the gap 110 and thereby change the properties of the gap 110 such that current may flow. For example, if a child swallows the battery 100 and the gap 110 is not enclosed in an airtight or liquid tight manner, the child's saliva may enter into the gap 110 and change its properties to more easily conduct electricity. This may then allow current to flow from the electrical source 112 to the cap terminal 106 without compression of the cap terminal 106.

The electrical source 112 may be any type of electrical source known in the art. Often, electrical sources within batteries include one or more electrochemical cells which convert chemical energy into electricity. Exemplary types of electrochemical cells include, but are not limited to, lithium ion, alkaline, zinc-carbon, nickel-cadmium, silver-oxide, lithium, or any other electrochemical electrical source known in the art. One of skill in the art will recognize the considerable variation of materials and configurations for the electrical source 112 well known in the art and that the present disclosure embraces use of any of these materials or configurations within its scope.

Exemplary operation of the pressure sensitive switch formed by the flexible wall 108 and cap terminal 106 will be discussed in relation to the following figures.

Figure 2A:
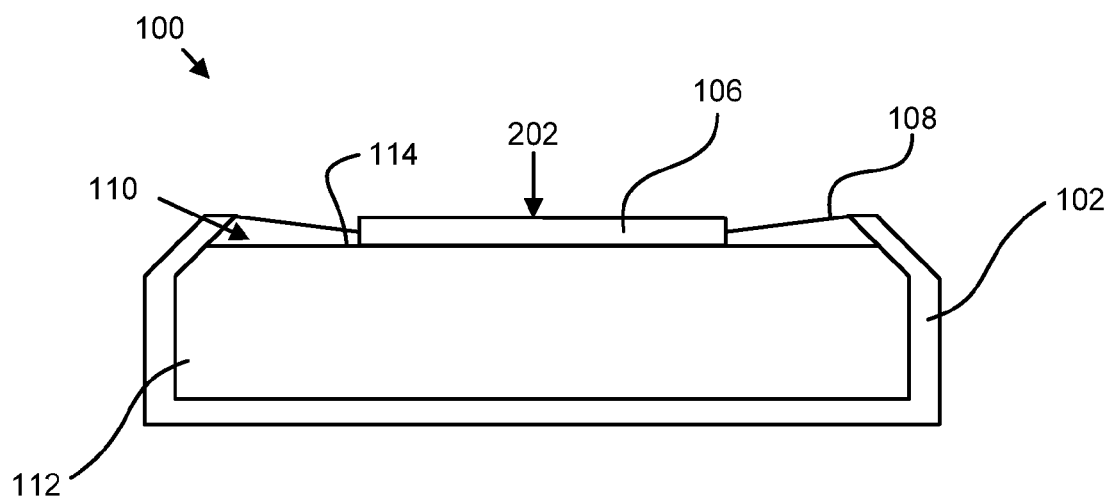
FIGS. 2A-2C are cross-sectional side views of a battery and end cap illustrating exemplary responses to external pressures in accordance with the present invention.
Figure 2B:
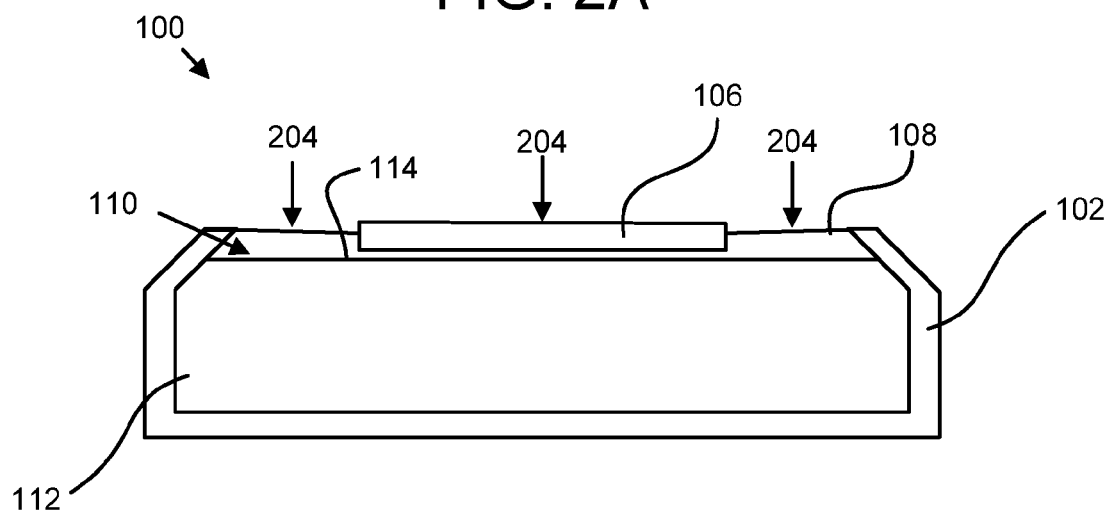
Figure 2C:
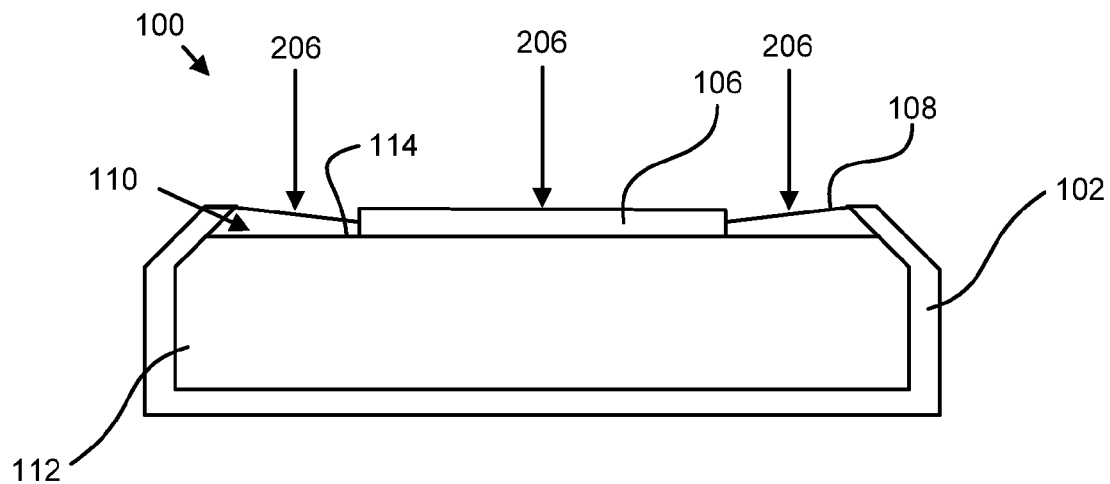

FIGS. 2A through 2C illustrate exemplary responses of the pressure sensitive switch to a variety of pressures when the gap 110 is filled with a gas. FIG. 2A is a cross-sectional view of the battery 100 with a small direct pressure 202. The small direct pressure 202 is applied directly to the cap terminal 106. The small direct pressure 202 may be a pressure provided, for example, by an electrical contact in a battery compartment of a device. The small direct pressure 202 may even include a pressure provided by any other object, such as a finger, pencil or other object that is rigid enough to overcome the bias provided by the flexible wall 108 and material in the gap 110. The gap 110 is depicted as shrinking sufficiently to allow the cap terminal 106 to contact the conductive surface 114 of the electrical source 112. Thus, the battery 100 may be able to provide electrical energy when the direct pressure 202 is applied.

FIG. 2B is a cross-sectional view of the battery 100 with a small distributed pressure 204 applied to the battery 100. The small distributed pressure 204 is depicted as applied uniformly to the upper end of the battery 100. According to one embodiment, the small distributed pressure 204 may include any pressure that applies a substantially uniform external pressure along the upper surface of the battery 100. For example, if the battery were subject to a higher atmospheric pressure or were placed within a liquid, there may be an increased uniform external pressure. This uniform external pressure may then apply a pressure equally to the cap terminal 106 and flexible wall 108 of the battery 100.

As another example, the small distributed pressure may include a pressure applied by a soft or flexible material. For example, if the battery 100 were placed between layers of soft foam, the foam may apply a small and substantially uniform pressure to the cap terminal 106 and flexible wall 108. As another example, the esophagus or internal pressure of the body of a child who has swallowed the battery 100 may apply a small distributed pressure 204 to the battery 100. For example, in one embodiment, one or more of esophageal peristalsis, gastric motility, and colonic motility within the child are not sufficient to depress the end cap and allow current to flow. In one embodiment, the insufficiency of the pressures provided by these bodily organs is due to the end cap 104 requiring a pressure of a greater magnitude. In one embodiment, the insufficiency of the pressures provided by these bodily organs is due to their inability to create a force or pressure directly targeted to the end cap terminal 106.

According to the depicted embodiment, the small distributed pressure 204 allows the gap 110 to shrink but is not sufficient to force the cap terminal 106 to contact the conductive surface 114 of the electrical source 112. The narrowing of the gap 110 may not be sufficient to allow current to flow, in one embodiment. For example, the impedance of the end cap 104 may remain at 100% even if a small pressure is applied to the battery 100 or cap terminal. In one embodiment, the narrowing of the gap 110 may allow a very small amount of current to flow. For example, the impedance of the end cap 104 may be slightly reduced but may not be sufficient to allow any more than a small current to flow. The allowed current may be so small that it may not be sufficient to cause damage when swallowed.

According to the depicted embodiment, the small distributed pressure 204 is equal to the small direct pressure 202 in magnitude. This is reflected in the lengths of arrows 202, 204. According to this embodiment, a small direct pressure 202 of a specific magnitude may be sufficient to overcome a bias keeping the cap terminal 106 from contacting the conductive surface 114 of the electrical source 112 while a small distributed pressure 204 of the same magnitude may not be sufficient. According to one embodiment, this is because a gap 110 filled with gas must be compressed to a greater extent when a distributed pressure is applied than if the pressure is applied directly to the cap terminal 106.

FIG. 2C is a cross-sectional view of the battery 100 with a large distributed pressure 206 applied to the battery 100. The large distributed pressure 206 is depicted as applied uniformly to the upper end of the battery 100, similar to the small distributed pressure 204 of FIG. 2B. The greater length of the arrows 206 illustrates that the large distributed pressure 206 is greater than the small distributed pressure 204 of FIG. 2B.

The large distributed pressure 206 may be created in a similar manner as the small distributed pressure 204, except that the pressure is greater. For example, the large distributed pressure 206 may reflect a greater external atmospheric or liquid pressure or may reflect a greater pressure created by a soft or flexible material. According to the depicted embodiment, the large distributed pressure 206 is sufficient to compress a gas in the gap 110 enough to allow the cap terminal 106 to contact the conductive surface 114 of the electrical source 112.

As illustrated by FIGS. 2A-2C, whether or not the gap 110 is closed sufficiently to allow current to flow may be dependent not only on the amount of pressure supplied but also on where the pressure is applied. For example, a direct pressure targeted to the cap terminal 106 may require a smaller magnitude than a distributed or uniform external pressure to close the gap 110. However, if the gap 110 is filled with a gas even a distributed external pressure of sufficient magnitude may still compress the gas and gap 110 enough to enable current flow.

Figure 3A:
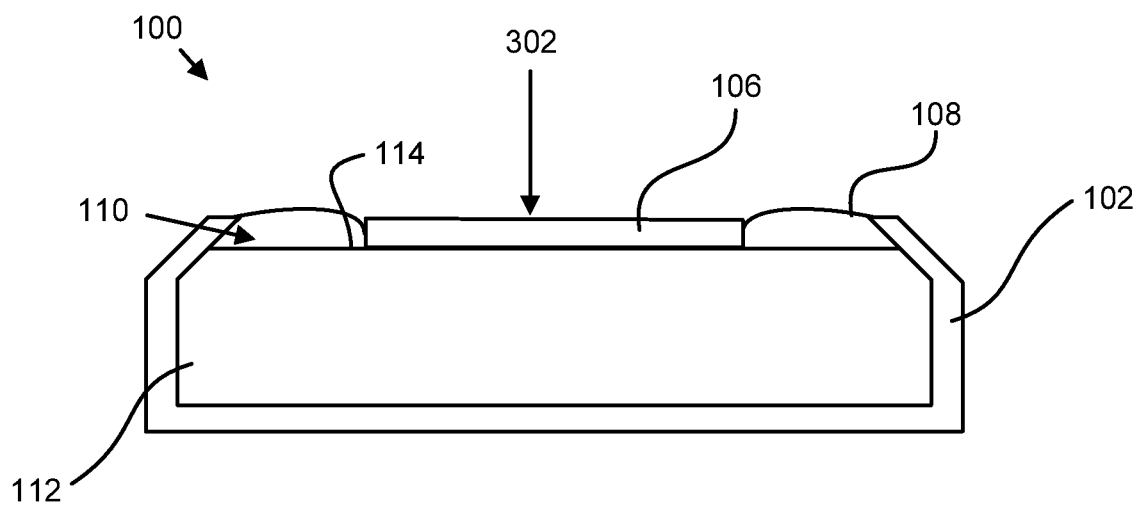
FIGS. 3A-3B are cross-sectional side views of a battery and end cap illustrating exemplary responses to external pressures in accordance with the present invention.
Figure 3B:
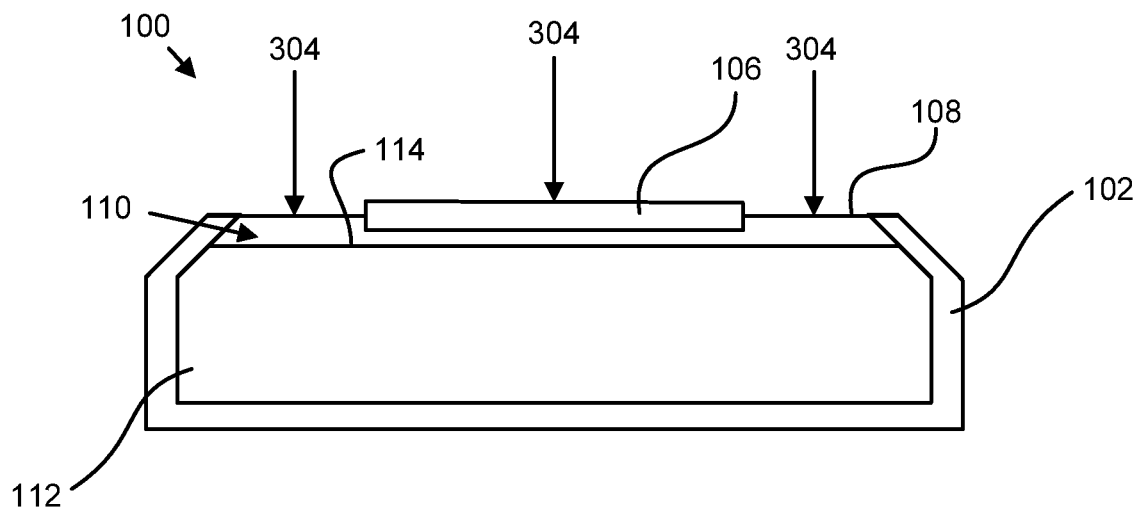

FIGS. 3A and 3B illustrate exemplary responses of the pressure sensitive switch to a variety of pressures where the gap 110 is filled with a liquid. Because liquid is generally less compressible than gas, or even incompressible, a gap 110 filled with liquid may operate differently than a gap 110 filled with gas.

FIG. 3A is a cross-sectional view of the battery 100 with a direct pressure 302 on the cap terminal 106. As depicted, the direct pressure 302 was sufficient to close the gap 110 and create contact between the cap terminal 106 and the conductive surface 114 of the electrical source 112. Because the gap 110 contains liquid, the flexible walls 108 are bulging to accommodate the displaced liquid. Thus, the direct pressure 302 needed, in one embodiment, is enough pressure to make the flexible walls 108 bulge and flex as shown.

Because the gap 110 was filled with a liquid rather than a gas, the flexible walls 108 are depicted as bulging outward. In one embodiment, this may be due to the displacement of the liquid by the closing of the gap 110 between the cap terminal 106 and the conductive surface 114 and because the liquid in the gap is not compressible. Thus, the flexible walls 108 must bulge to accommodate approximately the same volume of liquid as when the cap terminal was not depressed.

The embodiment of FIG. 3A illustrates exemplary differences between a liquid filled gap 110 and a gas filled gap 110. For example, with all other properties of the battery 100 held equal, a liquid filled gap 110 may require a greater force or pressure to compress the cap terminal 106 sufficiently to allow current to flow than a gas filled gap 110.

FIG. 3B is a cross-sectional view of the battery 100 with a distributed pressure 304 on the cap terminal 106. The distributed pressure is shown even spread across the cap terminal 106 and flexible wall 108. As discussed above, a distributed pressure may be created by a gas, liquid, or a soft or flexible material. As depicted, the distributed pressure 304 does not cause any compression or shrinking of the gap 110. In one embodiment, this is because the pressure is equally distributed across the upper end and the liquid in the gap 110 is not compressible. Thus, even a very large distributed pressure 304 may not be sufficient to compress the gap 110.

According to one embodiment, a liquid filled gap 110 may require a targeted and direct pressure to be applied to the cap terminal 106, such as pressure 302 of FIG. 3A, in order for current to flow. This may be desirable because it may be difficult or impossible for the esophagus or an internal organ of a human to provide such a direct and targeted pressure. More specifically, it may be difficult or impossible for one or more of esophageal peristalsis, gastric motility, and colonic motility to provide a direct and targeted pressure to the end cap terminal 106 such that the gap 110 may be closed sufficiently to allow current to flow. Generally, the pressure within the esophagus, other internal organs, and the pressure within the body of a human will look more like a distributed pressure (such as pressure 204 of FIG. 2B) and will likely be of small magnitude.

It is important to note that even though gases are compressible an internal pressure provided by a gas or tension provided by a flexible wall 108 may be sufficient to make it difficult or impossible for a sufficient distributed pressure to be applied by an esophagus or internal organ of a child or an adult. Thus, even the gas filled gap 110 of the battery of FIGS. 2A-2C may provide sufficient safety in the event a human swallows a battery. Thus what qualifies as a sufficient pressure to compress the gap 110 may vary according to different embodiments. In one embodiment, the insufficiency of the pressures provided by these bodily organs is due to the end cap 104 requiring a pressure of a greater magnitude than can be supplied by an internal organ, such as the esophagus or digestive tract. In one embodiment, the insufficiency of the pressures provided by these bodily organs is due to their inability to provide a pressure targeted to the cap terminal 106. For example, as discussed above, even a very large pressure, if it is distributed over the whole end cap 104 or the casing 102 of the battery 100 may not be sufficient to close the gap 110.

It is also important to note that the type of material placed in the gap 110 may affect the complexity of manufacturing of the battery 100. For example, a gap 110 with a liquid or a vacuum may be more difficult and expensive to manufacture than a gap 110 filled with air or gas.

Although FIGS. 2A-2C and 3A-3C discussed embodiments having a liquid or a gas within the gap 110, other embodiments are also possible and may be desirable. For example, an amount of liquid and an amount of gas may be disposed in the gap 110, in one embodiment. In one embodiment, the gap 110 may be mostly filled with a liquid but may also include a smaller amount of gas, such as a bubble of gas. The gap 110 filled with a liquid and a gas may provide a number of benefits. For example, the gas disposed within the gap 110 may reduce an amount of pressure needed to compress the gap 110. The gas may also limit the amount the flexible wall 108 must bulge outwards in order for the gap to close (see the bulge of the flexible wall 108 in FIG. 3A, for example). Reducing the bulge may allow a battery 100 to fit better within a battery compartment. A gas and liquid filled gap may also be more robust and less subject to damage as forces may be damped by the compressible gas.

Further variations and considerations may take place with regard to the type of liquid or gas that may be used within the gap 110. For example, a liquid may be selected that does not vary greatly in relation to temperatures differences occurring in common human environments, such as temperatures within a parked car on a sunny day or temperatures below the freezing point of water. For example, some liquids swell or shrink considerably in response to increases or decreases in temperatures. In one embodiment, a liquid, such as an oil, may be selected such that the variation in volume will be small. Other modifications that do not depart from the scope of the present invention regarding the gap 110, battery 100, and/or end cap 104 will be recognized in light of the present disclosure by one skilled in the art.

Figure 4:
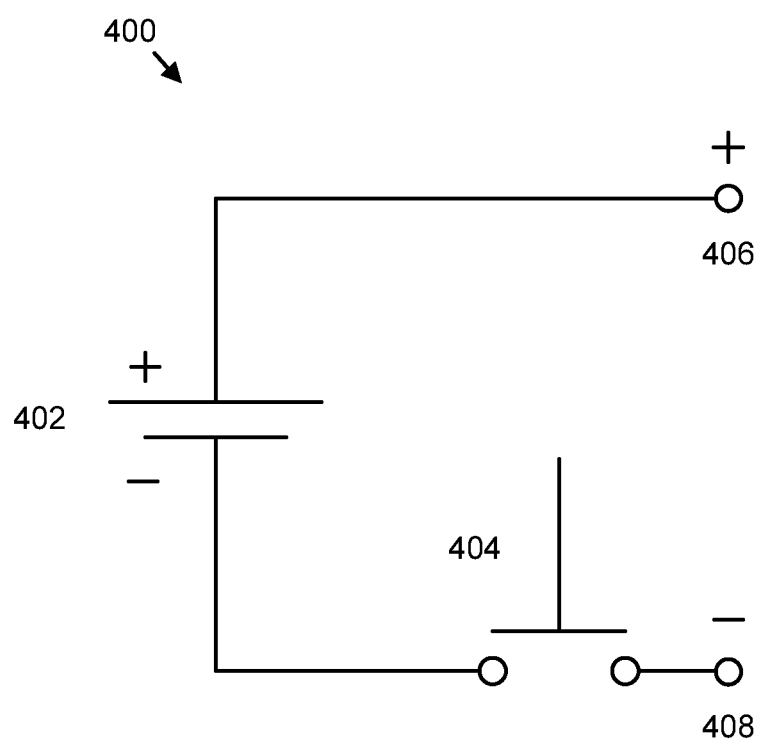
FIG. 4 is a schematic diagram of an electrical circuit illustrating one embodiment of an electrical circuit created by the batteries of FIGS. 1A-1C in accordance with the present invention.

Turning now to FIG. 4, a schematic diagram of an exemplary electrical circuit 400 created by a battery 100 having an end cap is shown. The electrical circuit 400 includes an electrical source 402. The electrical source 402 is shown in series with positive terminal 406, a pressure sensitive switch 404, and a negative terminal 408.

The electrical source 402 may be any portable electrical source known in the art. For example, the electrical source 402 may be an electrical source within the casing of a battery, such as the electrical source 112 of FIGS. 1A-3B. The electrical source may include a dry cell, wet cell, primary cell, secondary cell, or any other electrochemical cell known in the art.

The electrical source 402 is connected to a positive terminal 406. The positive terminal 406 may be a terminal of a battery. For example, the positive terminal 406 may be a portion of a casing such as the casing 102 of FIGS. 1A-3B. The positive terminal 406 may be configured for engaging an electrical contact within a battery compartment of a device.

The electrical source 402 is also connected to a pressure sensitive switch 404. According to one embodiment, the pressure sensitive switch 404 functions as a momentary on switch. According to one embodiment, the pressure sensitive switch 404 requires a minimum level of pressure in order to allow current to flow. In one embodiment, the pressure sensitive switch requires a direct pressure to a specific portion of a battery, such as a negative or positive terminal, in order to place the switch 404 in a closed position.

The pressure sensitive switch 404 is connected to a negative terminal 408. The negative terminal 408 may be a terminal of a battery. For example, the negative terminal 408 may include the cap terminal 106 of the battery 100 of FIGS. 1A-3B.

The electrical circuit 400 may only allow current to flow when the pressure sensitive switch 404 is in a closed position. Thus, if a load is placed across the positive terminal 406 and the negative terminal 408 current may still not flow. For example, even if a battery having the depicted electrical circuit 400 is swallowed by a child, current may not be able to flow because the pressure sensitive switch 404 is not in a closed position. According to one embodiment, the pressure sensitive switch cannot be placed in a closed position by an internal organ, such as an esophagus, of a child.

According to one embodiment, the electrical circuit 400 represents an electrical circuit created by the batteries 100 of FIGS. 1A-1C, 2A-2C, and 3A-3B. According to this embodiment, the electrical source 402 may correspond to the electrical source 112. The pressure sensitive switch 404 may correspond to a pressure sensitive switch of the end cap 104. The positive terminal 406 may correspond to the casing 102. The negative terminal 408 may correspond to the cap terminal 106. The components of the electrical circuit 400 may also correspond to components of batteries according to other embodiments. According to one embodiment, the electrical circuit 400 may be embodied by an end cap installed on a battery.

Figure 5:
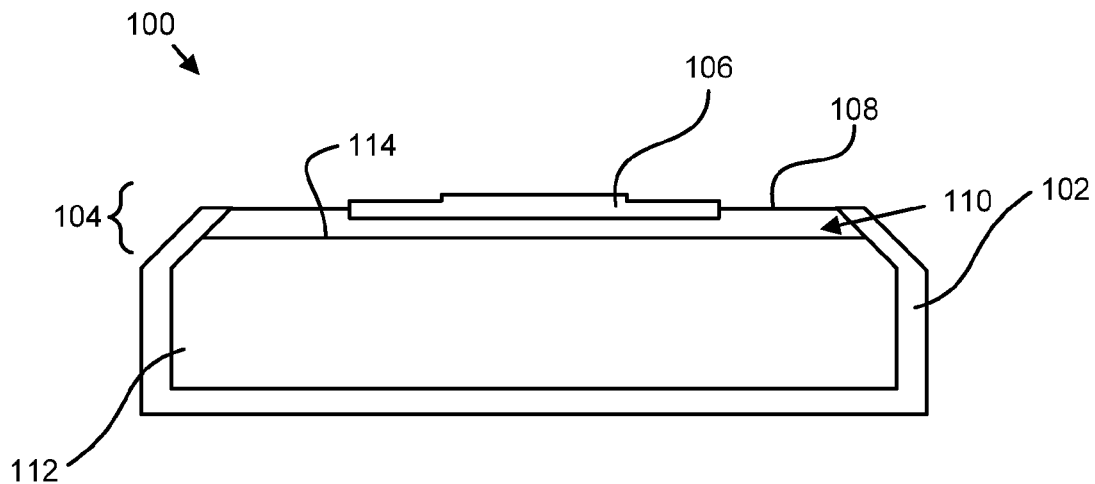
FIGS. 5-7 are cross-sectional side views of various embodiments of batteries and end caps in accordance with the present invention.
Figure 6:
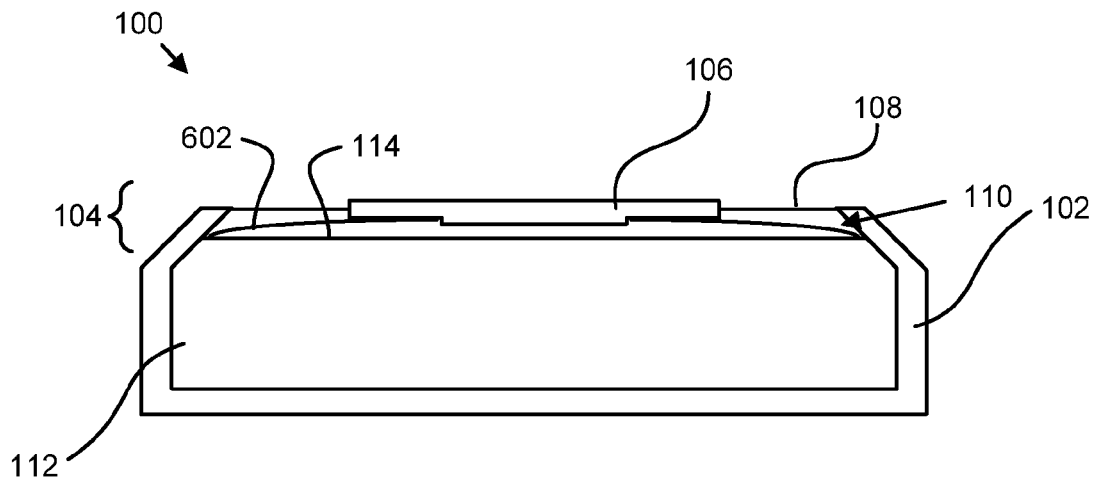

Turning now to FIGS. 5 and 6 exemplary variations on the batteries 100 of FIGS. 1A-3B are illustrated. FIG. 5 illustrates a battery 100 similar to the configurations of FIGS. 1A-3B except that the cap terminal 106 comprises a different cross-sectional shape. The cap terminal 106 of FIG. 5 includes a lug rather than a simple flat surface. The lug may be desirable to meet form factor standards for a certain type of battery. The lug may also be desirable to ensure that pressure applied to the cap terminal 106 is centered within the cap terminal 106.

FIG. 6 illustrates a battery 100 similar to the configurations of FIGS. 1A-3B except that a compression spring 602 is depicted in the gap 110. The compression spring 602 may provide a bias that biases the cap terminal 106 from contacting the electrical source 112. According to one embodiment, the compression spring 602 may be used in addition to any of the other features or variations discussed in relation to the gap 110, the cap terminal 106, and the flexible wall 108. According to one embodiment, the cap terminal 106 provides a bias that may supplement or replace a bias provided by a material in the gap 110, or a tension provided by the flexible wall 108. According to one embodiment, the compression spring may be used without a flexible wall 108.

The compression spring 602 may include any type of compression spring known in the art. For example, the compression spring may be a Belleville washer, a curved or wave spring, a clover dome, a serrated disc, or a slotted disc spring. The amount of force or pressure required to compress the compression spring may vary considerably. For example a material, thickness, shape, or other property of the compression spring may be varied to obtain a desired compression force or pressure. The compression spring may be formed of a variety of materials. According to one embodiment, the compression spring is formed of an electrically insulating material such as a plastic, rubber, neoprene or the like. According to another embodiment, the compression spring is formed of an electrically conductive material but is coated with an electrically insulating coating. According to another embodiment, the compression spring is formed of a conductive material but is placed such that it does not create an electrical connection between the electrical source 112 or the casing 102.

Figure 7:
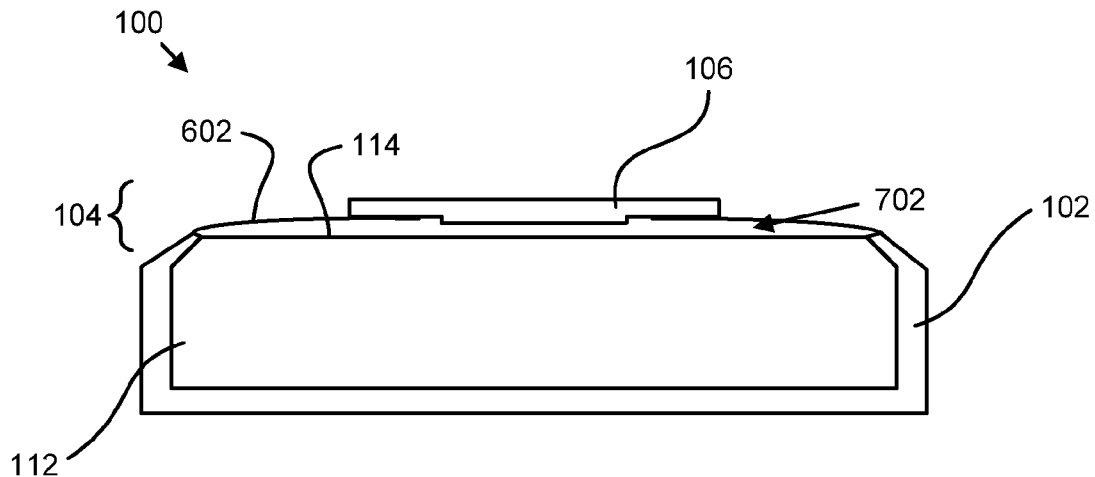

FIG. 7 illustrates an exemplary battery 100 having a compression spring 602 that also forms a wall between a gap 702 and area external to the battery 100. The compression spring 602 may provide the bias as discussed in relation FIG. 6 but may also provide a seal between the casing 102, and the cap terminal 106 to provide an airtight or liquid tight gap 702.

According to one embodiment, the compression spring 602 may be replaced with a flexible wall. The gap 702 may be filled with a material that provides an internal pressure which provides a bias of the cap terminal 106 away from contacting the conductive surface 114 of the electrical source 112.

FIGS. 1A-7 are for illustrating exemplary embodiments of batteries, end caps, and pressure sensitive switches. It will be clear to one skilled in the art may create numerous variations of the batteries, end caps, and pressure sensitive switches without departing from the scope of the present invention.

In addition to the variations depicted and discussed in relation to FIGS. 1A-7, the end cap 104 that includes a pressure sensitive switch may also be separate from a battery, in some embodiments. For example, an end cap 104 may be manufactured for retrofitting an already manufactured battery to embody the circuit 400 of FIG. 4. The separate end cap may include any of the features or variations discussed in relation to FIGS. 1A-7.

Figure 8A:
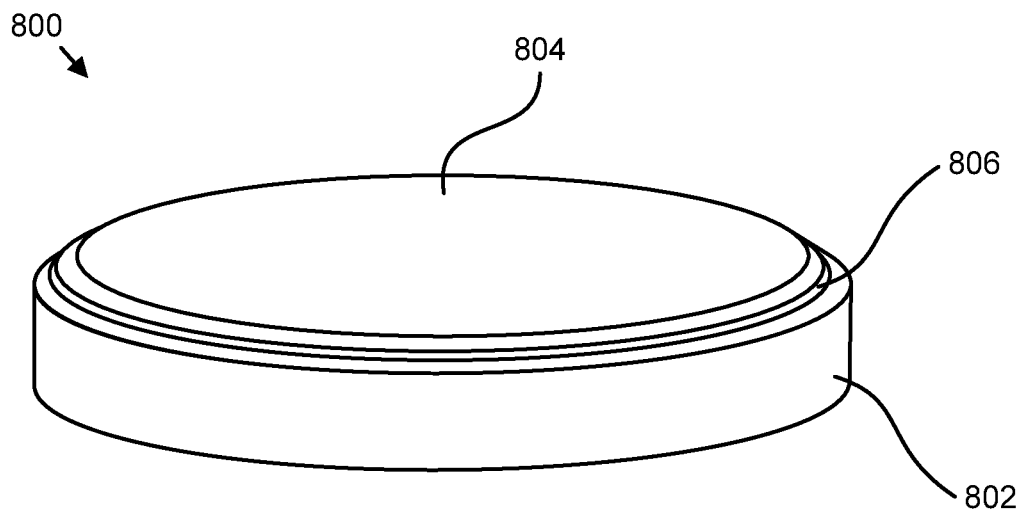
FIGS. 8A and 8B illustrate one embodiment of a battery having a button style form factor.
Figure 8B:
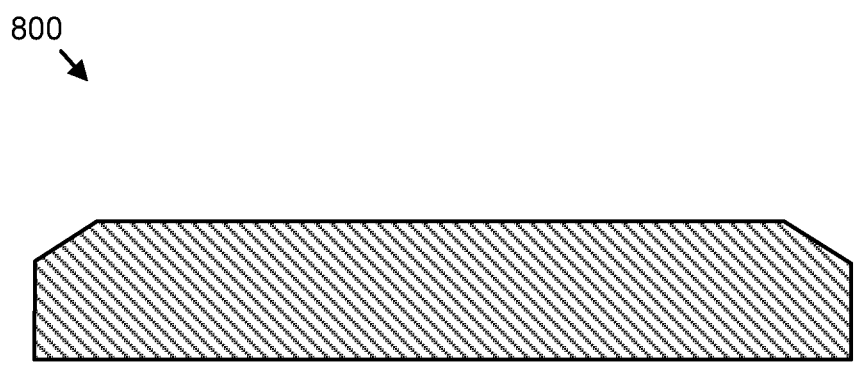

Turning to FIGS. 8A and 8B an exemplary battery 800 having a button style form factor is shown. The battery 800 represents a battery manufactured without an end cap 104. The battery 800 thus includes no pressure sensitive switch and represents a hazard to children who may swallow the battery 800. The form factor of the battery 800 is exemplary only and illustrates only one embodiment of a battery 800 manufacture without an end cap or pressure sensitive switch.

The battery 800 includes a first casing portion 802, a second casing portion 804, and an insulator 806. The first casing portion 802 and second casing portion 804 may enclose components of the battery 800. The first casing portion 802 and second casing portion 804 may also act as terminals for the battery 800. For example, the first casing portion 802 may act as a positive terminal and the second casing portion 804 may act as a negative terminal. The insulator 806 may electrically insulate the first casing portion 802 and second casing portion 804 in order to not short circuit an internal electrical source (not shown).

FIG. 8B illustrates an exemplary cross-sectional profile of the battery 800 of FIG. 8B. The cross-sectional profile of the battery 800 may help illustrate configurations of exemplary end caps. Details regarding internal components of the battery 800 are not shown.

According to one embodiment, a separate end cap that includes a pressure sensitive switch may be mounted to the battery 800 to provide the safety and benefits discussed in relation to FIGS. 1A-7. Exemplary separate end caps will be discussed in relation to the remaining figures.

Figure 9A:
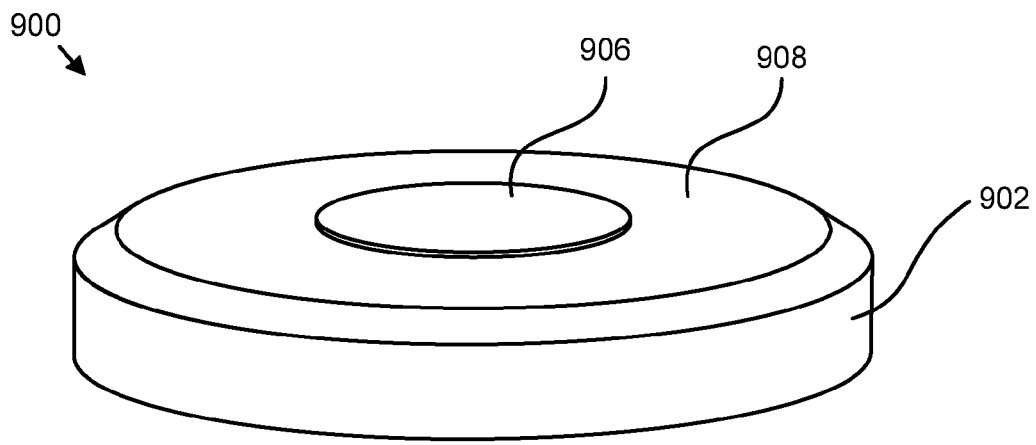
FIGS. 9A-9C illustrate one embodiment of an end cap in accordance with the present invention.
Figure 9B:
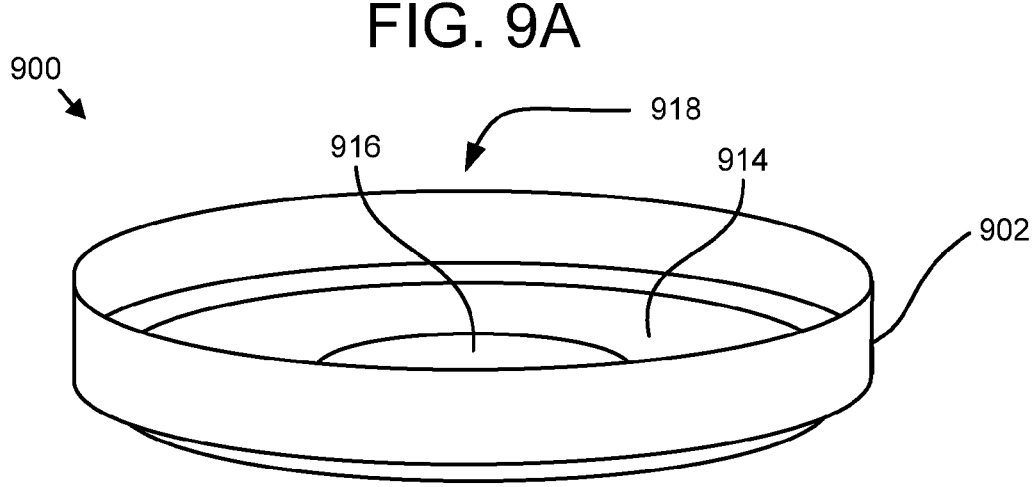
Figure 9C:
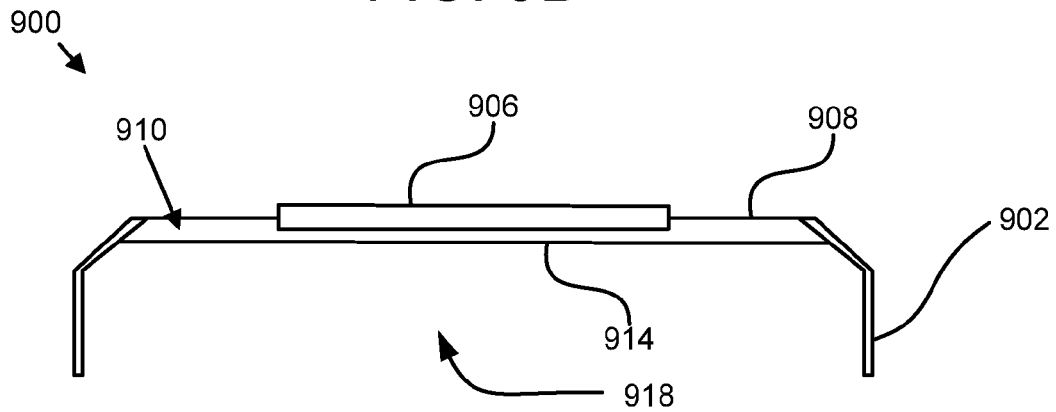

FIGS. 9A-9C illustrate one embodiment of a separate end cap 900 which may be mounted to a battery, for example the battery 800 of FIGS. 8A and 8B. FIG. 9A illustrates a perspective view of an upper end of the end cap 900. The upper end includes a cap terminal 906 and flexible wall 908. Also illustrated is a side wall 902. The side wall 902 is configured to enclose a portion of a battery, such as the battery 800 of FIGS. 8A and 8B.

FIG. 9B illustrates a perspective view of a lower end of the end cap 900. The view of FIG. 9B reveals a cavity 918 for receiving a portion of a battery. The cavity 918 is defined on its upper end (the lower end in the orientation depicted in FIG. 9B) by a separating wall 914. According to the depicted embodiment, the separating wall 914 includes a conductive surface 916.

FIG. 9C illustrates a cross-sectional view of the end cap 900 of FIGS. 9A and 9B. The cross-sectional view illustrates the cross-sectional shape of the side wall 902, cap terminal 906, the flexible wall 908, and the separating wall 914 of the end cap 900. The cross-sectional view also reveals a gap 910 between the cap terminal 906 and the separating wall 914. In the depicted embodiment, the gap 910 is enclosed by the side wall 902, the cap terminal 906, the flexible wall 908, and the separating wall 914. The gap 910 may contain a variety of materials, such as the materials discussed with regard to the battery embodiments of FIGS. 1A-7.

According to one embodiment, the cavity 918 is configured to receive a portion of a battery. For example, the shape and size of the cavity 918 may be varied according to a specific form factor. According to one embodiment, the cavity 918 may receive a battery having a button form factor or a larger battery, such as a camera battery.

In one embodiment, the end cap 900 may include features for engaging and retaining a battery within the cavity 918. According to one embodiment the size of the cavity 918 is configured to tightly fit around a portion of a battery. According to one embodiment, the side wall 902 and or separating wall 914 may include high friction materials that may help retain a battery in the cavity. In one embodiment, an adhesive may coat an interior surface of the cavity 918. In one embodiment, a glue may be placed in the cavity 918 prior to placing the battery within the cavity. In one embodiment, at least a portion of end cap 900 is formed of a material that shrinks in response to a temperature. For example, the side wall 902 may be formed of a heat-shrink material that shrinks in response to heat, for example from a heat gun. In one embodiment, a battery may be placed within the cavity and a heat gun may be used to heat the side wall 902 which may then shrink to engage and retain the battery within the cavity 918.

In one embodiment, the end cap 900 is formed to be largely non-conducting. This may restrict the risk of shorting out terminals on a battery to which it is mounted. According to one embodiment, only portions of the end cap 900 are conductive. According to one embodiment, portions of the end cap 900 are electrically conductive but are coated by an electrically insulating material. According to one embodiment, the cap terminal 106 and the conductive surface 916 of the separating wall 914 are conductive and may be used to create electrical contact with the battery. For example, the conductive surface 916 may be conductive so that it can create an electrical contact with a mounted battery. Thus, when the cap terminal 906 is compressed, it may allow current flow of the battery, in a similar manner discussed in relation to previous figures.

The side wall 902 may vary considerably similar to the casing 102 of the batteries of FIGS. 1A-7. For example, the side wall 902 may be formed of a rigid material and may thereby provide tension to the flexible wall 908. In one embodiment, the side wall 902 is flexible and the tension to the flexible wall 908, or the bias of the cap terminal 906 away from the separating wall 914 may be provided in another manner, such as by material within the gap 910.

Figure 10:
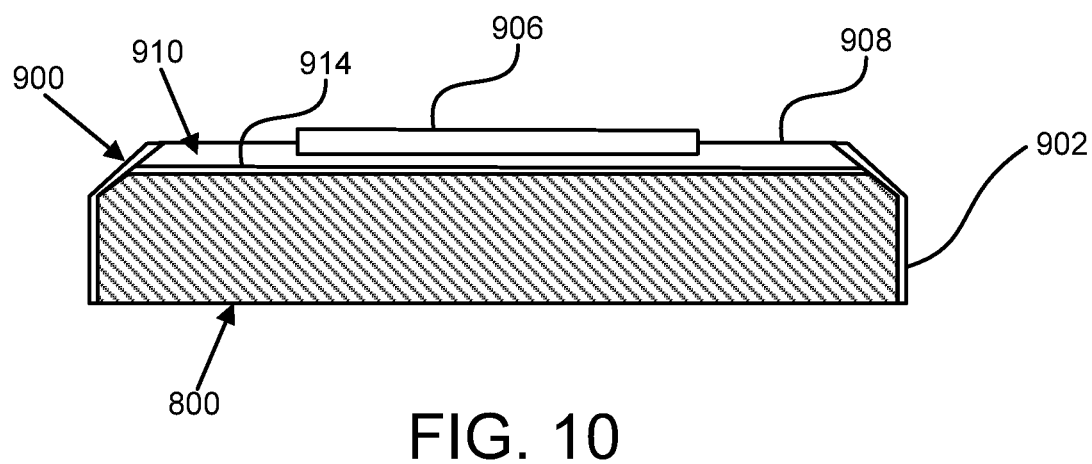
FIGS. 10-11 illustrate the end cap of FIGS. 9A-9C mounted on batteries having different form factors in accordance with the present invention.

FIG. 10 is a cross sectional view illustrating the end cap 900 mounted on the battery 800 of FIGS. 8A and 8B. The end cap 900 may be mounted on the battery by inserting the battery into the cavity 918. According to one embodiment, the cavity 918 is configured to retain the battery 800 with the cavity 918 with friction between the side wall 902 and the battery 800. In one embodiment, an adhesive such as a glue may be used to retain the end cap 900 on the battery. In one embodiment, a portion of the end cap 900 comprises a heat shrink material. The end cap 900 may be permanently or removably mounted on the battery 900.

According to one embodiment, the battery 800 with end cap 900 operates in substantially the same manner as the batteries 100 of FIGS. 1A-7. For example, pressure applied to the cap terminal 906 may compress the gap 910 and allow for current flow. Additionally, the end cap 900 may be modified in any way mentioned or discussed in relation to previous figures.

According to one embodiment, the separating wall 914, or a portion of the separating wall 914 includes a conductive surface 916 (not shown) which may allow electrical connection between the battery 800 and the cap terminal 906 when the cap terminal 906 is depressed.

According to one embodiment, the battery 800 with mounted end cap 900 may fit within a battery compartment of a device. For example, standards for battery form factors, as well as standards for battery compartments for receiving a specific form factor are provided by various standards setting organizations. According to one embodiment, the battery 800 with mounted end cap 900 may fit within a battery compartment designed for the battery 800. For example, the dimensions of the battery 800 plus battery end cap 900 may not vary enough from the battery 800 alone such that it no longer fits in a battery compartment. According to one embodiment, one or more portions of the end cap 900 are flexible allowing it to bend or flex to be accommodated into a battery compartment. For example, the battery compartment and/or electrical contacts within the battery compartment may compress the gap 910 such that current is allowed to flow.

Figure 11:
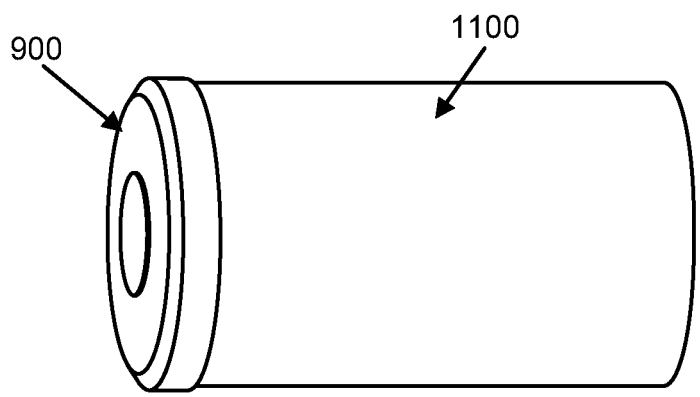

FIG. 11 illustrates one embodiment of the end cap 900 mounted on a camera battery 1100. According to one embodiment, camera batteries or other batteries may still be small enough to be swallowed by a child or adult. As such, it may be beneficial to mount the end cap 900 on batteries other than batteries having a button, disk, or coin style form factor. In the depicted embodiment, only a portion of the camera battery 1100 is accommodated into the end cap 900. Other embodiments may accommodate a larger portion of a battery.

The end cap 900 is depicted as mounted on an end of the camera battery 900. According to one embodiment, the end cap 900 may be mounted on either end. The end cap 900 may be modified in structure, shape, or configuration to be mounted to a specific end of the camera battery. For example, many batteries include a terminal lug on one end which may not allow for an end cap 900 of the embodiment of FIGS. 9A-9C to be properly mounted. For example, an AA type battery may include a flat surface on one end and a protruding terminal lug on another end. In one embodiment, the end cap 900 is modified to fit over such a terminal lug. For example, the shape of the separating wall 914 may be varied such that rather than being flat it includes a surface shape corresponding to a lug of a desired battery. For example, the retaining wall may include an indent for receiving the terminal lug. In one embodiment, the gap 910 may be varied as well. According to another embodiment, the end cap 900 may be mounted without modification on an end that does not include a terminal lug.

Figure 12:
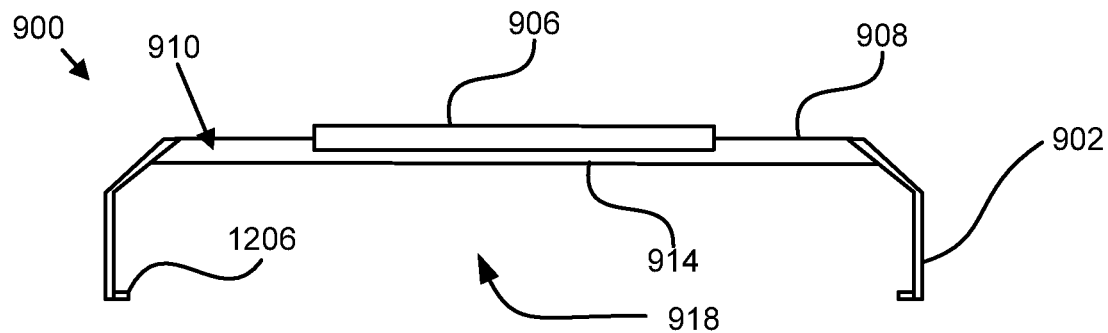
FIG. 12 illustrates one embodiment of an end cap in accordance with the present invention.

FIG. 12 illustrates a cross-sectional view of an end cap 900 that includes a ridge 1206 for retaining a battery within the cavity 918. For example, the ridge 1206 may help retain the battery 800 of FIGS. 8A and 8B within the cavity 918. One of skill in the art will, in light of the present disclosure, recognize other features may also be included for maintaining a battery within the cavity 918.

Figure 13A:
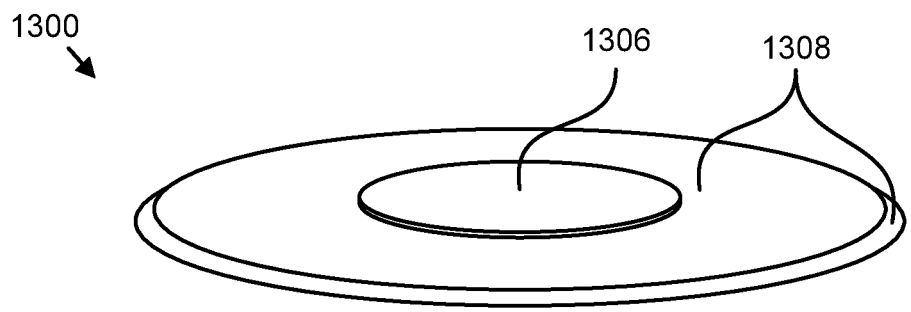
FIGS. 13A-13B illustrate one embodiment of an end cap in accordance with the present invention.
Figure 13B:
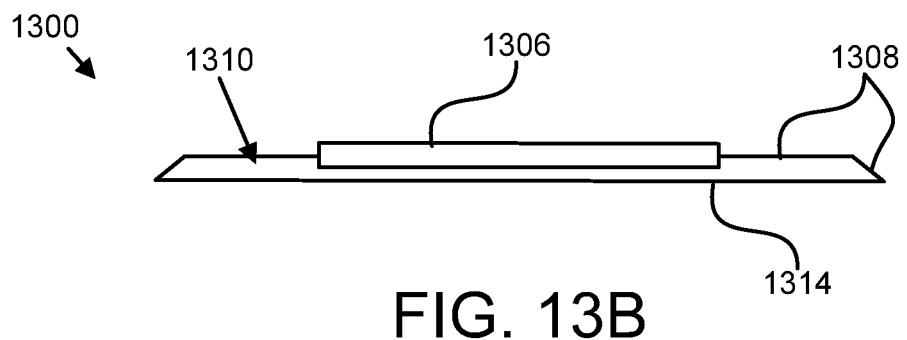

FIGS. 13A and 13B illustrate an end cap 1300 according to another embodiment. The end cap 1300 is similar to the end cap 900 of FIGS. 9A-9C but lacks the side walls 902. FIG. 13A is a perspective view illustrating an upper end of the end cap 1300. The end cap 1300 includes a cap terminal 1306 and a flexible wall 1308 similar to some previous embodiments. However, the end cap 1300 lacks a side wall in the embodiment of FIGS. 13A and 13B.

FIG. 13B is a cross-sectional side view of the end cap 1300 of FIG. 13A. The cross sectional view illustrates the flexible wall 1308 extending laterally and then downward towards a separating wall 1314. The separating wall 1314 defines a lower end of the end cap 1300. The separating wall 1314, flexible wall 1308, and cap terminal 1306 define and enclose a gap 1310. Similar to previous embodiments, the cap terminal 1306 may be biased away from the separating wall 1314. For example, material within the gap 1310 may provide a pressure internal to the gap 1310 which biases the cap terminal 1306 from contacting the separating wall 1314. In one embodiment, the gap 1310 may include a compression spring to bias the cap terminal 1306 away from the separating wall 1314. In one embodiment, the flexible wall 1308 may be replaced with a compression spring, which may then form a wall between a gap 1310 and areas external to the end cap 1300.

The end cap 1300 of FIGS. 13A and 13*b* may be configured to be adhered to a battery terminal. For example, the exterior of the separation wall 1314 may include an adhesive which may be used to adhere the end cap 1300 to a battery terminal in a manner similar to a sticker.

The end cap 1300 may operate in a manner similar to that discussed in relation to previous embodiments. For example, a pressure or force on the cap terminal 1306 may compress the gap 1310 and allow the cap terminal 1306 to contact the separating wall 1314. In one embodiment, the separating wall 1314 includes a conductive portion through which an electrical connection with the cap terminal 1306 can be communicated to a surface on which the separating wall 1306 is mounted.

According to one embodiment, the end cap 1300 may be mountable to a wider range of batteries than the embodiment of FIGS. 9A-12. For example, a side wall 902, such as the side wall 902 of FIGS. 9A-12, does not restrict to which batteries the end cap 1300 may be mounted, in one embodiment. In one embodiment, the end cap 1300 may be mountable to any surface or terminal of a battery as long as the surface or terminal is smaller than a surface area of the separation wall 1314. For example, the end cap 1300 may be mountable to a battery having an end larger than the separating wall 1314.

In one embodiment, the separation wall 1314 and flexible wall 1308 may form a flexible wall containing materials within the gap 1310, similar to a pouch. According to another embodiment, one or more portions of the flexible wall 1308 and the separating wall 1314 may be at least semi rigid to maintain a shape of the end cap 1300. For example, the separating wall 1314 may be rigid to maintain a flat surface for mounting on a battery while the flexible wall 1308 allows for the end cap 1306 to be compressed to contact the flexible wall 1308.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A battery end cap comprising:
   a cap terminal, the cap terminal comprising an external conductive surface and an internal conductive surface; and
   a pressure sensitive switch comprising an air gap between the internal conductive surface of the cap terminal and an electrical source of a battery, wherein when the battery end cap is installed on the battery, the pressure sensitive switch is configured to bias the internal conductive surface of the cap terminal from being in electrical communication with the electrical source,
   wherein the pressure sensitive switch is in a closed position when a sufficient external pressure is applied to the battery end cap and wherein the pressure sensitive switch is in an open position without the sufficient external pressure.

2. The battery end cap of claim 1, wherein the battery end cap is built-in to the battery.

3. The battery end cap of claim 2, wherein the battery with the built-in battery end cap comprises dimensions meeting one or more battery dimension standards.

4. The battery end cap of claim 2, wherein the battery with the built-in battery end cap comprises one or more dimensions meeting one or more battery dimension standards when the external pressure is applied.

5. The battery end cap of claim 4, wherein the one or more dimensions meeting one or more battery dimension standards when the external pressure is applied comprises a height of the battery.

6. The battery end cap of claim 1, wherein the switch comprises a flexible wall, the air gap at least partially defined by the flexible wall.

7. The battery end cap of claim 6, wherein a sufficient differential in pressure on the external conductive surface and the flexible wall results in electrical communication between the inner conductive surface of the cap terminal and the electrical source.

8. The battery end cap of claim 1, wherein the battery end cap is attachable to the battery.

9. The battery end cap of claim 8, wherein when the battery end cap is attached to the battery, a length and a width of the battery are substantially the same.

10. The battery end cap of claim 9, wherein the battery comprises a size wherein the battery is small enough to be swallowed by a human.

11. The battery end cap of claim 1, wherein the pressure sensitive switch is one or more of liquid-tight and air-tight.

12. A battery comprising:
    an electrical source;
    a casing;
    a cap terminal, the cap terminal comprising an external conductive surface and an internal conductive surface; and
    a pressure sensitive switch comprising an air gap between the internal conductive surface of the cap terminal and the electrical source, the pressure sensitive switch is configured to bias the internal conductive surface of the cap terminal from being in electrical communication with the electrical source,
    wherein the pressure sensitive switch is in a closed position when a sufficient external pressure is applied to the battery end cap and wherein the pressure sensitive switch is in an open position without the sufficient external pressure.

13. A battery end cap comprising:
    a first end and a second end, the second end for engaging a portion of a battery;
    a cap terminal, the cap terminal comprising an external conductive surface and an internal conductive surface; and
    a pressure sensitive switch comprising an air gap between the internal conductive surface of the cap terminal and an electrical source of the battery, wherein when the battery end cap is installed on the battery, the pressure sensitive switch is configured to bias the internal conductive surface of the cap terminal from being in electrical communication with the electrical source,
    wherein the pressure sensitive switch is in a closed position when a sufficient external pressure is applied to the battery end cap and wherein the pressure sensitive switch is in an open position without the sufficient external pressure.

14. The battery end cap of claim 13, wherein the second end comprises a cavity for receiving a portion of the battery.

15. The battery end cap of claim 13, wherein when the battery end cap is attached to the battery, the battery and end cap fit within a battery compartment designed for the battery.

16. The battery end cap of claim 13, wherein the pressure sensitive switch is one or more of liquid-tight and air-tight.

17. A method for creating a battery having an end cap comprising:
    providing the battery;
    providing the battery end cap, the battery end cap comprising,
      a first end and a second end, the second end for engaging a portion of a battery;
      a cap terminal engaging the first end, the cap terminal comprising an external conductive surface and an internal conductive surface; and
      a pressure sensitive switch comprising an air gap between the internal conductive surface of the cap terminal and an electrical source of the battery, wherein the pressure sensitive switch is configured to bias the internal conductive surface of the cap terminal from being in electrical communication the electrical source,
      wherein the pressure sensitive switch is in a closed position when a sufficient external pressure is applied to the battery end cap and wherein the pressure sensitive switch is in an open position without the sufficient external pressure; and
    mounting at least a portion of the second end to the battery.

* * * * *